US011953929B2

(12) United States Patent
Gorai et al.

(10) Patent No.: US 11,953,929 B2
(45) Date of Patent: Apr. 9, 2024

(54) OPERATION DEVICE

(71) Applicants: ALPS ALPINE CO., LTD., Tokyo (JP); OLYMPUS CORPORATION, Tokyo (JP)

(72) Inventors: Shigeto Gorai, Miyagi (JP); Tetsu Numata, Miyagi (JP); Akihiro Kusaka, Miyagi (JP); Shunsuke Kimura, Fukushima (JP); Reiji Koyama, Tokyo (JP)

(73) Assignees: ALPS ALPINE CO., LTD., Tokyo (JP); OLYMPUS CORPORATION, Tokyo (JP)

( * ) Notice: Subject to any disclaimer, the term of this patent is extended or adjusted under 35 U.S.C. 154(b) by 102 days.

(21) Appl. No.: 17/658,723

(22) Filed: Apr. 11, 2022

(65) Prior Publication Data

US 2022/0236759 A1 Jul. 28, 2022

Related U.S. Application Data

(63) Continuation of application No. PCT/JP2020/039771, filed on Oct. 22, 2020.

(30) Foreign Application Priority Data

Oct. 29, 2019 (JP) ................................ 2019-195905

(51) Int. Cl.
*G05G 1/02* (2006.01)
*G05G 1/06* (2006.01)
(Continued)

(52) U.S. Cl.
CPC ................ *G05G 1/02* (2013.01); *G05G 1/06* (2013.01); *H01H 13/14* (2013.01); *H01H 13/20* (2013.01); *G05G 5/05* (2013.01)

(58) Field of Classification Search
CPC .. G05G 1/02; G05G 1/06; G05G 5/05; H01H 13/14; H01H 13/20; H01H 2221/084;
(Continued)

(56) References Cited

U.S. PATENT DOCUMENTS 4,715,569 A * 12/1987 Essig .................... H02B 1/044 200/295
2022/0244751 A1* 8/2022 Kimura .............. G02B 23/2476
2022/0246374 A1* 8/2022 Gorai ..................... H01H 25/04

FOREIGN PATENT DOCUMENTS

CN 203647310 U * 6/2014 ............... A61B 1/00
JP H05-211987 8/1993
(Continued)

OTHER PUBLICATIONS

Machine translation of CN 203647310U, Shiboda et al., Jun. 18, 2014 (Year: 2014).*
(Continued)

*Primary Examiner* — Vinh Luong
(74) *Attorney, Agent, or Firm* — IPUSA, PLLC

(57) ABSTRACT

When an operation knob 10 formed of silicone rubber is pushed laterally, a stem 7 tilts with a contact portion (i) as a fulcrum, a push button portion 6*b* is pushed, and a contact point in a switch mechanism portion 6*a* operates to turn on a switch circuit. Even if, by a large operating force F3 being applied, the operation knob 10 is extended and the inner surface portion 15, which is a ceiling surface of an internal space 13 of the operation knob 10, rides on an upper end portion 7*c*, a reinforcing surface 19 provided on the inner surface portion 15 slides on the upper end portion 7*c*, and the operation knob 10 returns to the initial shape.

9 Claims, 5 Drawing Sheets

(51) Int. Cl.
*H01H 13/14* (2006.01)
*H01H 13/20* (2006.01)
*G05G 5/05* (2006.01)

(58) Field of Classification Search
CPC ....... H01H 2221/064; H01H 2227/036; H01H 2235/016; H01H 25/06
See application file for complete search history.

(56) References Cited

FOREIGN PATENT DOCUMENTS

| | | | | |
|---|---|---|---|---|
| JP | 2003-305000 | | 10/2003 | |
| JP | 2005-011597 | | 1/2005 | |
| JP | 3937670 B2 | * | 6/2007 | ............. H01H 25/04 |
| JP | 2014-117574 | | 6/2014 | |
| JP | 2018134355 A | * | 8/2018 | ............... A61B 1/00 |

OTHER PUBLICATIONS

Machine translation of JP 2018134355A, Togashi, Aug. 30, 2018 (Year: 2018).*
Machine translation of JP 3937670B2, Jun. 27, 2007 (Year: 2007).*
International Search Report for PCT/JP2020/039771 dated Dec. 22, 2020.

* cited by examiner

OPERATION DEVICE

CROSS-REFERENCE TO RELATED APPLICATIONS

This application is a continuation of International Application No. PCT/JP2020/039771, filed on Oct. 22, 2020 and designating the U.S., which claims priority to Japanese Patent Application No. 2019-195905, filed Oct. 29, 2019. The contents of these applications are incorporated herein by reference in their entirety.

BACKGROUND OF THE INVENTION

1. Field of the Invention

The present disclosure relates to an operation device having a tilting stem and an operation knob formed of an elastic material covering the stem.

2. Description of the Related Art

Patent Document 1 discloses an invention relating to a push button device in which a switch unit is turned on in both a vertical direction pressing operation and a lateral direction pressing operation.

The push button device includes a first stem and a second stem below the first stem. Both when the first stem is pushed vertically and when the first stem is tilted by applying a lateral force, the second stem is pushed down, and the switch unit is turned on by the second stem.

The first stem and the second stem are covered with a finger hook member formed of silicone rubber and the inside is sealed. A hook member is provided inside the finger hook member. The hook member is disposed so as to surround the circumference of the first stem. When a push force is applied to the finger hook member in a lateral direction or a diagonal direction, the push force is applied to the first stem via the hook member.

In the push button device disclosed in Patent Document 1, when the finger hook member is pushed laterally or diagonally, the hook member directly hits the first stem and the first stem is tilted. In this structure, feeling of resistance when the hook member directly hits the first stem is transmitted to the finger through the finger hook member, which may deteriorate the operation feeling. In order to soften the operation feeling, the hook member is formed of a silicone rubber which is elastic and easily deformable.

Therefore, the hook member and the first stem are set vertically long such that, when a large operating force is applied and the finger hook member is greatly deformed and stretched, the hook member does not get over the first stem. Accordingly, it is prevented that the first stem cannot return to the original shape due to being disengaged from the outside of the hook member.

However, if the hook member or the first stem is set long, the height dimension of the push button device increases, and the size of the push button device also increases.

The present disclosure solves the above-described conventional problem and an object of the present disclosure is to provide an operation device which has a good operation feeling when the operation knob is pressed and can reduce the height dimension of the push button device.

RELATED-ART DOCUMENTS

Patent Documents

Patent Document 1: Japanese Laid-Open Patent Publication No. H05-211987

SUMMARY OF THE INVENTION

The present disclosure is an operation device including a support portion, a stem configured to tilt to the support portion, a switch portion located below the stem and operated by a tilting operation of the stem, and an operation knob formed of an elastic material that covers at least a portion of the stem. A downward inner surface portion located below the upper end portion of the stem and a housing recess, formed by being recessed upwardly from the inner surface portion, that houses an upper portion including at least the upper end portion of the stem are formed inside of the operation knob. A reinforcing surface is exposed on the inner surface portion, and the reinforcing surface is disposed continuously or intermittently in a direction surrounding the stem.

In the operation device according to the present disclosure, it is preferable that the reinforcing surface has a smaller coefficient of friction on a surface than the elastic material forming the operation knob.

In the operation device according to the present disclosure, it is preferable that a minimum distance from a downward opening edge of the housing recess to the reinforcing surface is shorter than a radius of the stem.

In the operation device according to the present disclosure, it is preferable that the reinforcing surface includes an inclined surface that is directed downward as a distance from the stem increases.

Further, at least a peripheral edge of the upper end portion of the stem is an inclined surface that is directed downward as a distance from a center of the stem increases.

The operation device according to the present disclosure further includes a reinforcing member provided in the operation knob continuously or intermittently in a direction surrounding the housing recess. The reinforcing surface is a bottom surface of the reinforcing member.

In the operation device according to the present disclosure, it is preferable that the reinforcing member has higher rigidity than the elastic material forming the operation knob.

In the operation device according to the present disclosure, it is preferable that the reinforcing member is embedded inside of the operation knob, and the elastic material forming the operation knob is provided between the reinforcing member and the stem.

In the operation device according to the present disclosure, the stem is movably supported in a direction along the center line thereof, and the switch portion can be operated even when the stem is pressed downward along the center line by the operation knob.

In the operating device according to the present disclosure, the downward inner surface portion is formed on the operation knob made of an elastic material, and at least a part of the stem is housed in the housing recess formed in the inner surface portion. Further, the reinforcing surface is exposed on the inner surface portion. In this configuration, even when the operation knob is pushed in the lateral direction or the diagonal direction with a large force, the operation knob is greatly deformed, and the inner surface portion rides on the tip surface of the stem, the reinforcing surface exposed on the inner surface slides on the tip surface of the stem. Accordingly, the operation knob can be easily restored to the original shape. Therefore, as it is not required to provide a vertically long housing recess or stem, the height dimension of the device can be reduced.

Further, by embedding a reinforcing member having a reinforcing surface in the operation knob and disposing an elastic material of the operation knob between the stem and the reinforcing member, the operation feeling when operating the stem by pushing the operation knob is improved.

DESCRIPTION OF THE EMBODIMENTS

Figure 1:
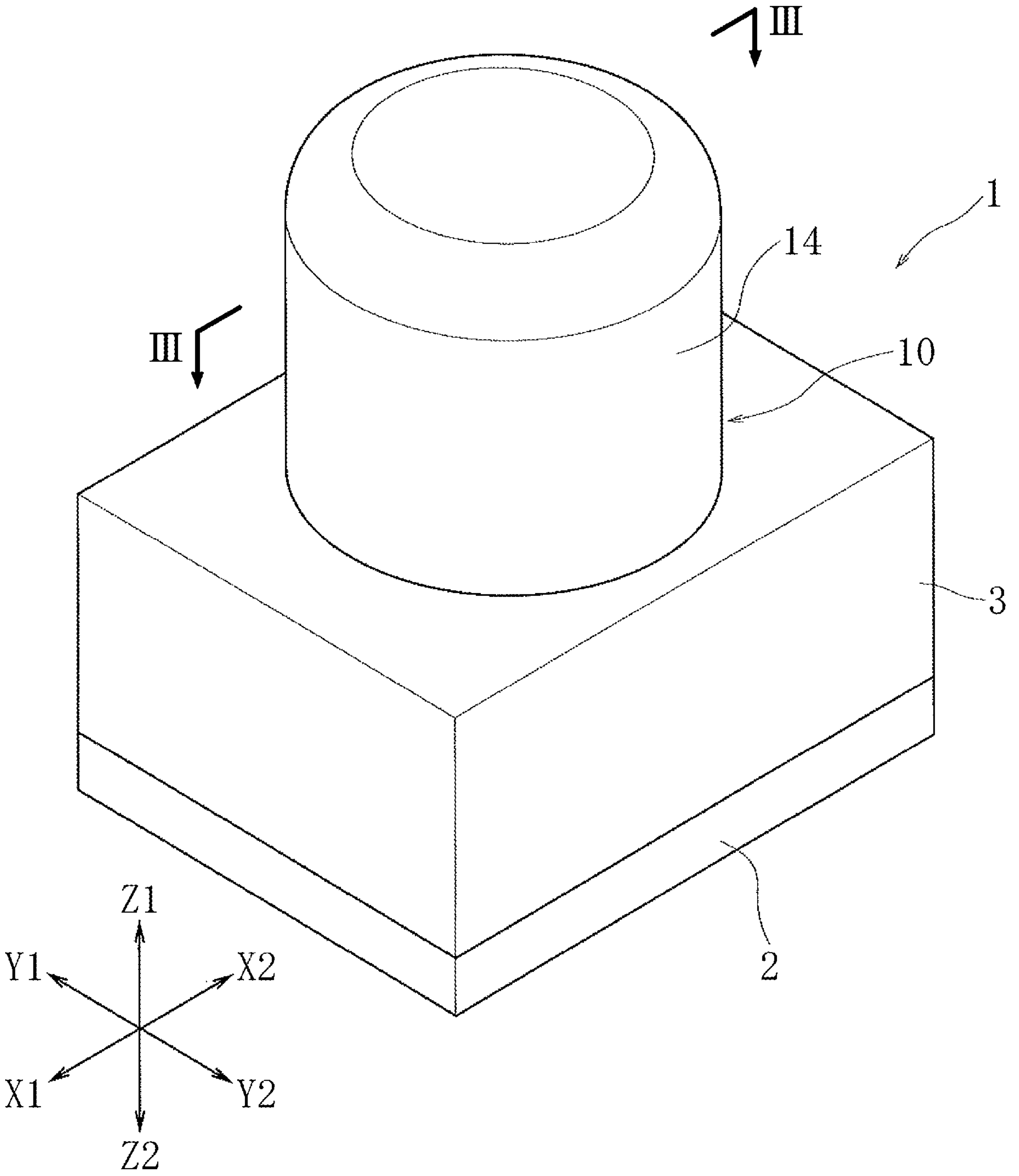
FIG. 1 is a perspective view illustrating an overall structure of an operation device according to an embodiment of the present invention.
Figure 2:
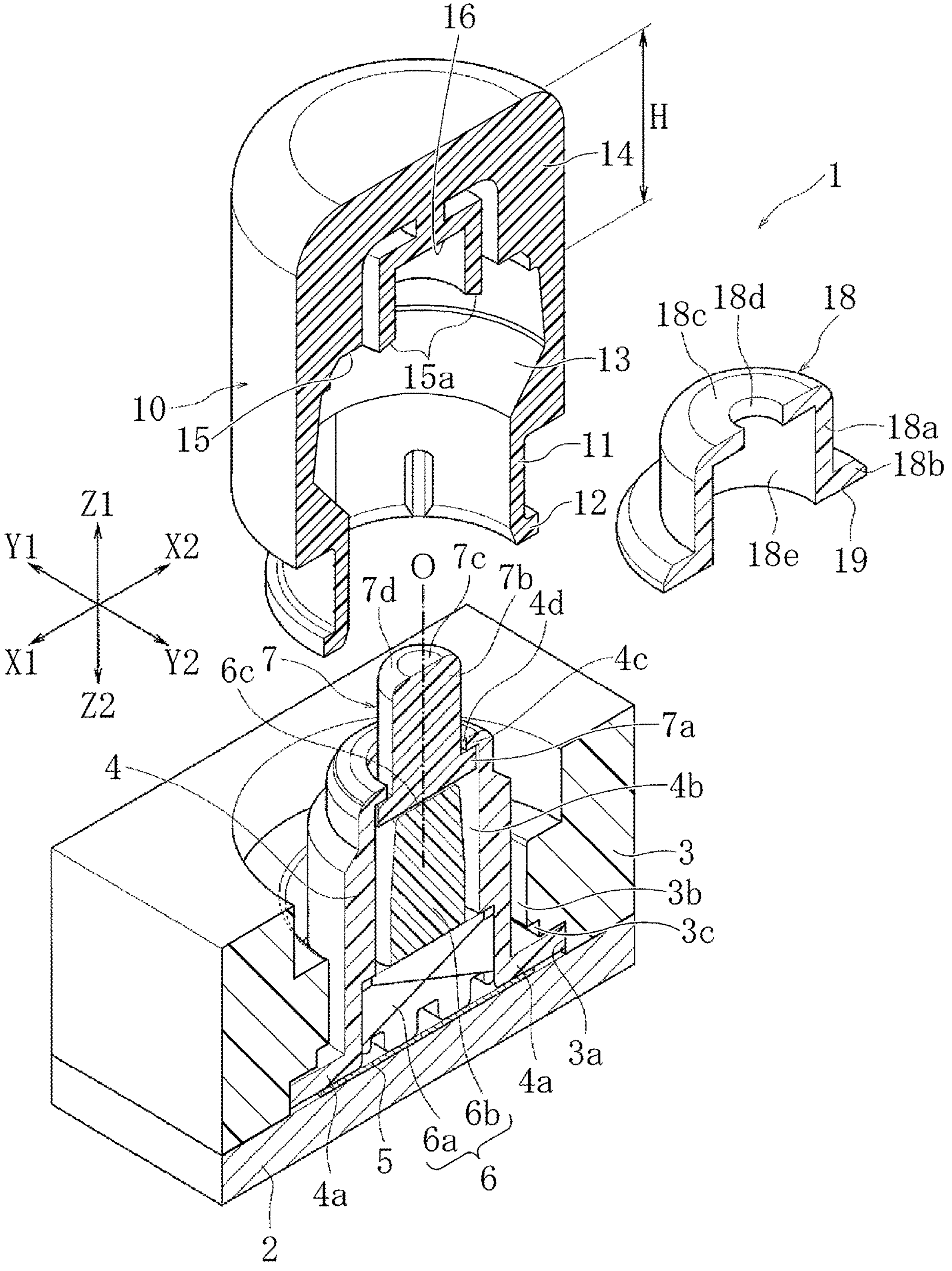
FIG. 2 is an exploded perspective view illustrating the operation device illustrated in FIG. 1 in a half section.
Figure 3:
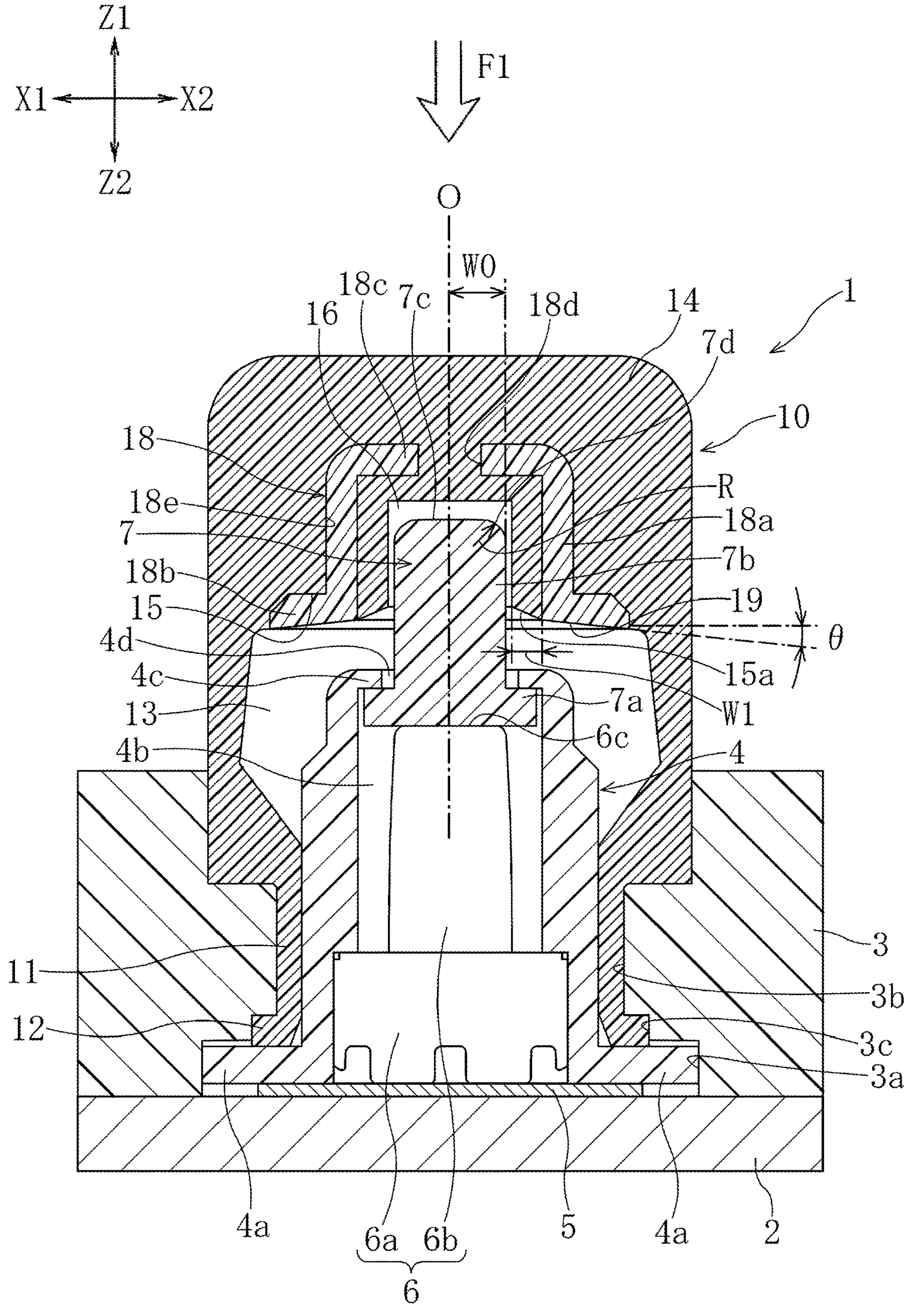
FIG. 3 is a cross-sectional view taken along the line III-III of FIG. 1 when no external force is applied to the operation device illustrated in FIG. 1.

An operation device 1 of an embodiment of the present invention illustrated in FIG. 1, FIG. 2 and FIG. 3 is used in an operation part of an apparatus used for internal observation of various types of machines and apparatuses or of an endoscope apparatus used for internal observation of a human body, or is used in an operation part of various other types of electronic apparatuses.

In the operation device 1, the Z1 direction is an upward direction and the Z2 direction is a downward direction. However, the operation device 1 may use the Z1-Z2 direction in any direction in the space of the operating parts of various electronic devices.

The operation device 1 includes a lower case 2 and an upper case 3. In the lower portion of the upper case 3, a holding recess **3*a* is formed in a portion facing the lower case 2. An inner case 4 is provided in the space inside the upper case 3. The inner case 4 includes a flange portion 4*a* that extends in a circumferential direction at a lower end portion. A flexible wiring board 5 is provided between the lower case 2 and the flange portion 4*a*. The lower case 2 and the upper case 3 are fixed to the flange portion 4*a* when the flange portion 4*a* is fitted to the holding recess 3*a*. In the operation device 1, a "support portion" is constituted by the lower case 2, the upper case 3, and the inner case 4. The lower case 2, the upper case 3, and the inner case 4** are formed of a synthetic resin material.

A cylindrical operation space **4*b* extending vertically is formed inside the inner case 4. A switch portion 6 is housed inside the operation space 4*b*. The switch portion 6 includes a switch mechanism portion 6*a* and a push button portion 6*b*. The switch mechanism portion 6*a* includes a switching contact and a return spring for preloading the push button portion 6*b* upward (in the Z1 direction) inside the housing. The housing of the switch mechanism portion 6*a* is fixed so as not to move below the operation space 4*b*. The switching contact has a fixed contact and a movable contact, and the fixed contact is conductive to the conductive layer on the surface of the flexible wiring board 5**.

In the push button portion **6*b*, a lower portion is housed in the switch mechanism portion 6*a*, and an upper portion protrudes upward from the switch mechanism portion 6*a*. When the push button portion 6*b* is pressed in the Z2 direction, the movable contact is depressed by the push button portion 6*b*, and a switch circuit is switched on. Further, the push button portion 6*b* is always preloaded in the Z1 direction by the return spring in the switch mechanism portion 6*a***.

An upper support wall portion **4*c* is formed at the upper portion of the inner case 4 to close the upper portion of the operation space 4*b*, and an operation hole 4*d* is opened in the upper support wall portion 4*c*. Inside the operation space 4*b*, a stem 7 is disposed between an upper end portion 6*c* of the push button portion 6*b* and the upper support wall portion 4*c*. The stem 7 is formed of a synthetic resin material. The stem 7 includes a shaft portion 7*b* which protrudes upwardly through the operation hole 4*d* and a fulcrum flange portion 7*a* which is integrally formed in the lower portion of the shaft portion 7*b* and faces the lower surface of the upper support wall portion 4*c* provided at the upper portion of the inner case 4. In FIG. 3, a center line O (a center line of the shaft portion 7*b*) of the stem 7 is illustrated. The shaft portion 7*b* includes an upper end portion 7*c* facing in the Z1 direction. An inclined surface 7*d* is formed on the peripheral edge of the upper end portion 7*c* so as to be directed downward (in the Z2 direction) as the distance from the center line O increases. As illustrated in FIG. 3, a cross-sectional shape of the inclined surface 7*d* is an arc shape of the radius R. However, the inclined surface 7*d*** may be a tapered surface.

An operation knob 10 is provided in the operation device 1. The operation knob 10 is an elastic material having elasticity and is formed of synthetic rubber or elastomer. The operation knob 10 of the present embodiment is formed of silicone rubber.

The operation knob 10 includes a lower cylindrical portion 11 and a flange portion 12 located at a lower side (on the Z2 side) of the cylindrical portion 11. As illustrated in FIG. 3, a cylindrical portion holding space **3*b* and a lower flange portion holding space 3*c* below the cylindrical portion holding space 3*b* are provided between the upper case 3 and the inner case 4. The lower cylindrical portion 11 of the operation knob 10 is provided in the cylindrical portion holding space 3*b*, and the flange portion 12 is provided in the lower flange portion holding space 3*c*. An internal space 13 is formed inside the operation knob 10, but the lower portion of the operation knob 10 is tightly fixed between the upper case 3 and the inner case 4, thereby maintaining the hermetic properties of the internal space 13 of the operation knob 10**.

As illustrated in FIG. 2, the operation knob 10 includes an operation driving portion 14 located above the internal space 13, and when an operating force is applied to the operation knob 10, the force is mainly transmitted from the operation driving portion 14 to the stem 7. A reinforcing member 18 is embedded within the operation driving portion 14 of the operation knob 10. The reinforcing member 18 is formed of polybutylene terephthalate (PBT) resin, and the reinforcing member 18 and the operation knob 10 are formed by so-called dichroic molding. That is, the reinforcing member 18 is first molded by PBT resin, and then, the molded reinforcing member 18 is inserted into the mold and the operation knob 10 in close contact with the reinforcing member 18 is molded by silicone rubber.

As illustrated in FIG. 2, the reinforcing member 18 includes a cylindrical portion 18*a* which continuously surrounds the center line O, a ceiling portion 18*c* which is continuous above the cylindrical portion 18*a*, and a flange portion 18*b* which extends in the circumferential direction continuously to the lower portion of the cylindrical portion 18*a*. The surface facing the lower portion (in the Z2 direction) of the flange portion 18*b* is a reinforcing surface 19. An inner space 18*e* is formed inside the cylindrical portion 18*a*, and a through hole 18*d* is formed in the ceiling portion 18*c* in the vertical direction. Further, the reinforcing member 18 is not limited to one that forms a cylindrical surface continuously facing the periphery of the center line O, and the cylindrical surface may be arranged intermittently toward the periphery of the center line O. That is, the reinforcing member 18 may be composed of a plurality of members and the plurality of members may be embedded in the operation knob 10. In this case, the reinforcing surface 19 is also intermittently arranged in the peripheral direction of the center line O.

As illustrated in FIG. 3, when the reinforcing member 18 is embedded in the operation knob 10, the elastic material forming the operation knob 10 continues into the inner space 18*e* of the cylindrical portion 18*a* through the through hole 18*d* in the ceiling portion 18*c* of the reinforcing member 18. In the operation knob 10, a housing recess 16 is formed in the elastic material located inside the inner space 18*e* to be recessed upwardly (the Z1 direction), and an upper portion 7*e* including the upper end portion 7*c* of the shaft portion 7*b* of the stem 7 is housed in the housing recess 16. Note that most of the shaft portion 7*b* as well as the upper portion of the shaft portion 7*b* of the stem 7 may be housed in the housing recess 16.

Inside the operation knob 10, a ceiling surface 13*a* of the interior space 13 is a downwardly oriented inner surface portion 15. The inner surface portion 15 is located below the upper end portion 7*c* of the stem 7. The housing recess 16 is open to the inner surface portion 15. The reinforcing surface 19 which is the lower surface of the flange portion 18*b* of the reinforcing member 18 is exposed on the inner surface portion 15. As illustrated in FIG. 3, the reinforcing surface 19 includes an inclined surface that descends downward (in the Z2 direction) as the distance from the center line O increases and that is inclined by an angle θ. Further, a minimum distance W1 from an opening edge of the housing recess 16 to the reinforcing surface 19 is shorter than a radius W0 of the stem 7.

Further, a lower surface of the elastic material located within the inner space 18*e* of the reinforcing member 18, that is, a lower surface 15*a* of the inner surface portion 15 around the opening edge of the housing recess 16, is also an inclined surface that tilts in the same direction as the reinforcing surface 19.

The reinforcing member 18 formed of PBT resin has higher rigidity than the operation knob 10 formed of silicone rubber. Further, a coefficient of static friction with respect to the stem 7 of the reinforcing surface 19 which is the lower surface of the reinforcing member 18 is smaller than a coefficient of static friction with respect to the stem 7 of the silicone rubber forming the operation knob 10.

Next, operations of the operation device 1 will be described.

As illustrated by an arrow in FIG. 3, when a downward operating force F1 is applied to the upper surface of the operation knob 10 facing the Z1 side, the operating force F1 acts on the upper end portion 7*c* of the stem 7 from the operation knob 10, and the stem 7 moves downward in the operation space 4*b* of the inner case 4. Then, the push button portion 6*b* is pushed down by the stem 7, and the switch portion 6 operates to turn on the switch circuit.

The reinforcing member 18 is embedded within the operation driving portion 14 of the operation knob 10, and the ceiling portion 18*c* of the reinforcing member 18 is located such that the peripheral portion of the through hole 18*d* covers the upper end portion 7*c* of the stem 7. The elastic material of the operation knob 10, the ceiling portion 18*c* thereon, and the elastic material thereon are sequentially stacked above the upper end portion 7*c* of the stem 7. Since the operating force F1 is transmitted to the stem 7 through the highly rigid ceiling portion 18*c*, the stem 7 and the push button portion 6*b* can be pushed down reliably against the force of the return spring in the switch mechanism portion 6*a*. Further, the operating force F1 is applied to the upper end portion 7*c* of the stem 7 from the ceiling portion 18*c* through the elastic material, and the ceiling portion 18*c* and the stem 7 do not come into direct contact with each other, so that the operation feeling is good.

Figure 4:
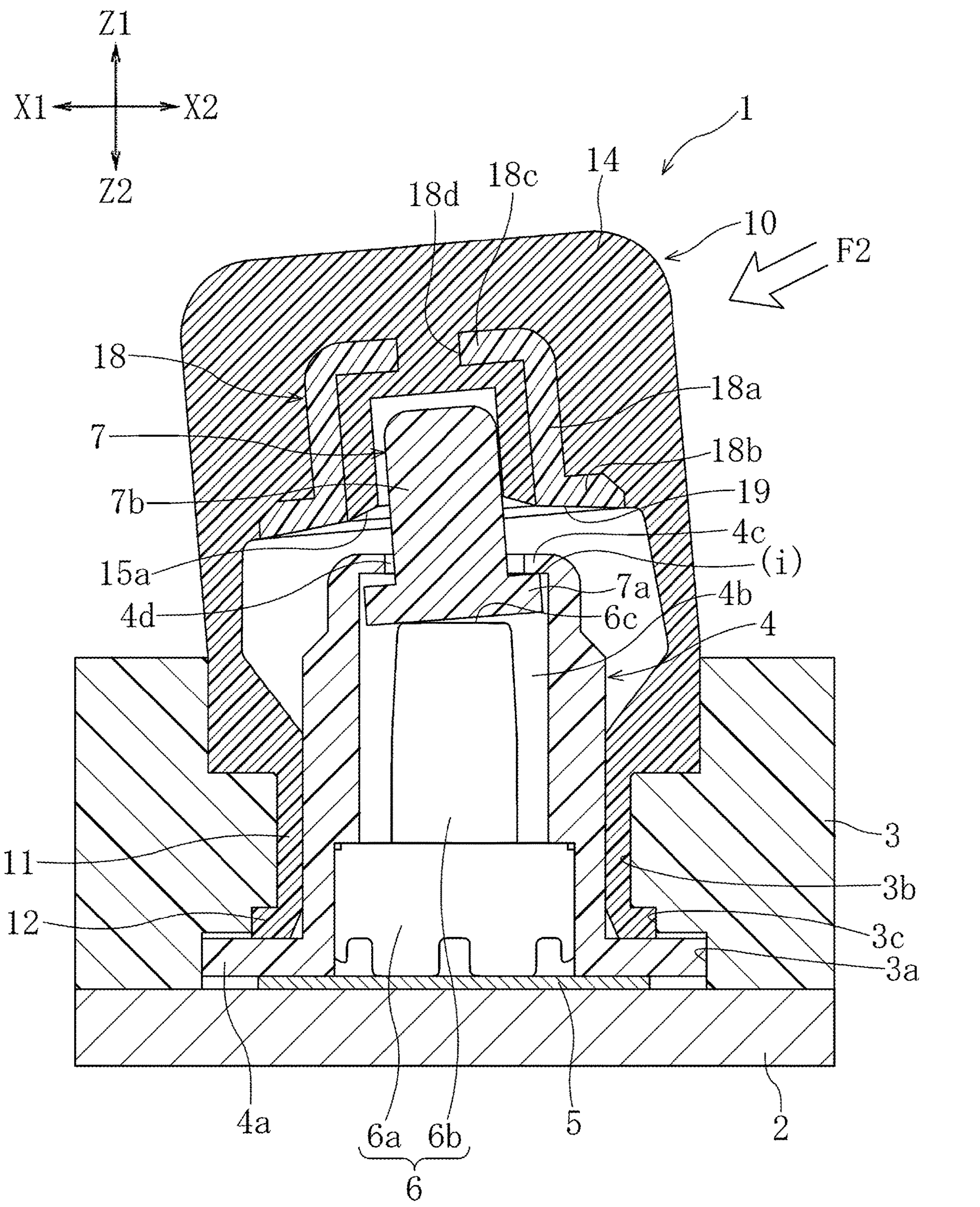
FIG. 4 is a cross-sectional view illustrating an operation when a pressing force in a lateral direction or a diagonal direction is applied to an operation knob of the operation device illustrated in FIG. 3.

FIG. 4 illustrates an operation when a diagonal operation force F2 in the X1 direction and the Z2 direction is applied to the operation driving portion 14 of the operation knob 10. In this case, the same operation is performed when the operation driving portion 14 is pushed directly toward the X1 direction. Further, the same operation is performed when the operating force is applied in the X2 direction, the Y1 direction, or the Y2 direction.

When the operating force F2 illustrated in FIG. 4 is applied, the operating force F2 is applied from the operation driving portion 14 of the operation knob 10 to the stem 7. Subsequently, the stem 7 is tilted such that the upper end portion 7*c* moves in the X1 direction with a contact point (i), which is a contact point between the upper peripheral edge of the fulcrum flange portion 7*a* and the lower surface of the upper support wall portion 4*c* of the inner case 4, as a fulcrum. Due to the tilting action of the stem 7, the push button portion 6*b* below the stem 7 is pushed downward, and the contact point in the switch mechanism portion 6*a* operates to turn on the switch circuit.

Also in this case, since the operating force F2 is applied to the stem 7 from the cylindrical portion 18*a* of the reinforcing member 18 through the elastic material, the stem 7 and the push button portion 6*b* can be operated reliably against the force of the return spring in the switch mechanism portion 6*a*. Further, the operating force F2 is applied from the cylindrical portion 18*a* to the side of the stem 7 through the elastic material inside the cylindrical portion 18*a*, and the cylindrical portion 18*a* and the stem 7 do not come into direct contact with each other, so that the operation feeling is good.

Further, the reinforcing member 18 is embedded inside the operation driving portion 14 of the operation knob 10 and the peripheral portion and the upper portion of the operation driving portion 14 of the operation knob 10 are covered by the reinforcing member 18. Therefore, no matter which part of the operation driving portion 14 of the operation knob 10 is pressed, it is possible to prevent the elastic material forming the operation knob 10 from being compressed and deformed more than required and to prevent the elastic material from being stretched more than required. Accordingly, fatigue of the operation driving portion 14 that is constantly pressed by a finger can be reduced.

Figure 5:
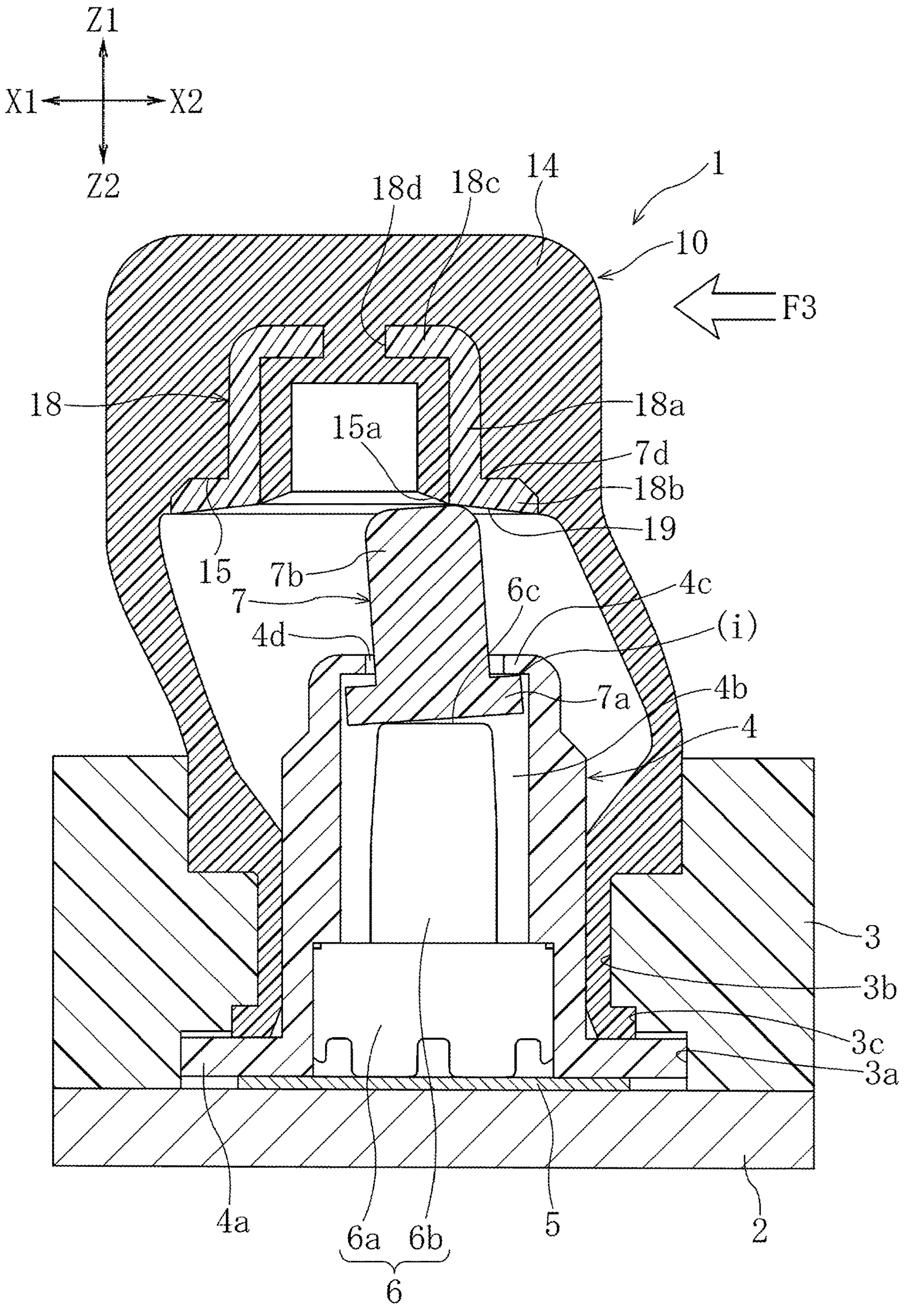
FIG. 5 is a cross-sectional view illustrating an operation when a pressing force in the lateral direction or the diagonal direction is applied to the operation knob of the operation device illustrated in FIG. 3 and the operation knob is greatly extended. %

FIG. 5 illustrates an operating state when a large operating force F3 (or a large operating force F2 in the diagonal direction illustrated in FIG. 4) is applied laterally to the operation driving portion 14 of the operation knob 10.

When the large lateral operating force F3 is applied to the operation knob 10, as in the case of FIG. 4, the stem 7 is tilted with the contact point (i) as a fulcrum, and the push button portion 6*b* is pushed downward. Subsequently, the contact point in the switch mechanism portion 6*a* is operated to turn on the switch circuit. Further, since the silicone rubber, which is an elastic material forming the operation knob 10, has high elasticity, if the operation force F3 is large, the operation knob 10 is greatly deformed. Thus, as illustrated in FIG. 5, the inner surface portion 15, which is the ceiling surface 13*a* of the internal space 13 of the operation knob 10, may be ride on the upper end portion 7*c* of the stem 7.

At this time, the reinforcing surface 19, which is the lower surface of the reinforcing member 18, is exposed to the inner surface portion 15 which is the ceiling surface 13*a* of the inner space 13, and the reinforcing surface 19 is mainly rides on the upper end portion 7*c* of the stem 7. The reinforcing surface 19 has higher rigidity than the silicone rubber forming the operation knob 10 and has a lower coefficient of static friction with respect to the stem 7. Accordingly, due to the contraction force of the stretched silicone rubber, the reinforcing surface 19 slides on the upper end 7*c* of the stem 7 and the operation knob 10 immediately returns to the initial shape illustrated in FIG. 3.

In particular, the reinforcing surface 19 is provided with an inclined surface of the angle θ and the lower surface 15*a* of the elastic material inside the reinforcing member 18 is also provided with an inclined surface. Further, the peripheral edge of the upper end portion 7*c* of the stem 7 also has the inclined surface 7*d*. Therefore, due to the elastic contraction force of the silicone rubber, the inner surface portion 15 including the reinforcing surface 19 slides easily on the upper end portion 7*c*, and the operation knob 10 easily returns to the initial shape illustrated in FIG. 3.

As described above, in the operation device of the present invention, even when the operation knob is pushed in the lateral direction or the diagonal direction with a large force, the operation knob is greatly deformed, and the inner surface portion rides on the tip surface of the stem, the operation knob is easily restored to the original shape. Therefore, it is not required to provide a vertically long housing recess or stem to absolutely prevent the inner surface from riding the tip surface of the stem even when a large force is applied. Accordingly, the height dimension of the device can be reduced. This enables to reduce restrictions on the size and location of the device. Alternatively, when operating in the lateral direction or the diagonal direction, since the distance from the fulcrum of the tilt of the stem can be controlled to reduce the operation stroke in the lateral or the diagonal direction, the degree of freedom in stroke setting can be increased. Further, by embedding the reinforcing member having the reinforcing surface in the operation knob and disposing the elastic material of the operation knob between the stem and the reinforcing member, the operation feeling at the time of operating the stem by pressing the operation knob is improved.

In the above embodiment, when the operation knob 10 is pressed laterally, the stem 7 is tilted with the contact portion (i) as a fulcrum, and the push button portion 6*b* of the switch portion 6 is pressed by the stem 7 to operate the contact point in the switch mechanism portion 6*a*. However, the present invention is not limited to the above embodiment, for example, a lifting stem that moves up and down may be provided instead of the push button portion 6*b*, and the lifting stem may be used to operate a switch portion such as a membrane switch located below the switch. Alternatively, a diagonally operating stem 7 can directly operate a switch portion such as a membrane switch.

Further, a reinforcing member such as a ring that only forms a reinforcing surface 19 may be embedded inside the operation knob 10, so that the circumference and the upper portion 7*e* of the stem 7 are not covered with the reinforcing member.

What is claimed is:

1. An operation device comprising:

a support portion;

a stem configured to tilt;

a switch portion located below the stem and operated by a tilting operation of the stem; and an operation knob formed of an elastic material, wherein the operation knob includes an inner surface portion, located below an upper end portion of the stem, that forms a ceiling surface of an internal space, and a housing recess, formed by being recessed upwardly from the inner surface portion, that houses an upper portion including at least the upper end portion of the stem, and wherein a reinforcing surface is exposed on the inner surface portion, and the reinforcing surface is disposed continuously or intermittently in a direction surrounding the stem.

2. The operation device according to claim 1, wherein the reinforcing surface has a smaller coefficient of friction on a surface than the elastic material forming the operation knob.

3. The operation device according to claim 1, wherein a minimum distance from a downward opening edge of the housing recess to the reinforcing surface is shorter than a radius of the stem.

4. The operation device according to claim 1, wherein the reinforcing surface includes an inclined surface that descends downward as a distance from a center of the stem increases.

5. The operation device according to claim 1, wherein at least a peripheral edge of the upper end portion of the stem is an inclined surface that descends downward as a distance from a center of the stem increases.

6. The operation device according to claim 1, further comprising a reinforcing member provided in the operation knob continuously or intermittently in a direction surrounding the housing recess, wherein the reinforcing surface is a bottom surface of the reinforcing member.

7. The operation device according to claim 6, wherein the reinforcing member has a higher rigidity than the elastic material forming the operation knob.

8. The operation device according to claim 6, wherein the reinforcing member is embedded in the operation knob, and the elastic material forming the operation knob is provided between the reinforcing member and the stem.

9. The operation device according to claim 1, wherein the switch portion is operated when the stem is moved downwardly by the operation knob.

* * * * *